United States Patent
Nakamatsu et al.

[11] Patent Number: 5,326,444
[45] Date of Patent: Jul. 5, 1994

[54] APPARATUS FOR ELECTROLYTIC OZONE GENERATION

[75] Inventors: Shuji Nakamatsu; Yoshinori Nishiki; Masaaki Katoh, all of Kanagawa, Japan

[73] Assignee: Permelec Electrode Ltd., Kanagawa, Japan

[21] Appl. No.: 28,169

[22] Filed: Mar. 9, 1993

[30] Foreign Application Priority Data

Mar. 9, 1992 [JP] Japan ................... 4-086441

[51] Int. Cl.$^5$ ............................................. C25B 11/00
[52] U.S. Cl. ............................. 204/290 R; 204/265; 204/277; 204/291; 204/294
[58] Field of Search ............... 204/277, 265, 290 R, 204/291, 294

[56] References Cited

U.S. PATENT DOCUMENTS

| | | | |
|---|---|---|---|
| 4,316,782 | 2/1982 | Foller et al. | 204/129 |
| 4,416,747 | 11/1983 | Menth et al. | 204/129 |
| 4,541,989 | 9/1985 | Foller | 204/176 |
| 4,927,514 | 5/1990 | Solomon et al. | 204/290 R |
| 5,203,972 | 4/1993 | Shimamune et al. | 204/129 |

FOREIGN PATENT DOCUMENTS

| | | |
|---|---|---|
| 0051440 | 5/1982 | European Pat. Off. . |
| 0319489 | 6/1989 | European Pat. Off. . |
| 0357077 | 3/1990 | European Pat. Off. . |

*Primary Examiner*—John Niebling
*Assistant Examiner*—Kishor Mayekar
*Attorney, Agent, or Firm*—Sughrue, Mion, Zinn, Macpeak & Seas

[57] ABSTRACT

An electrolytic ozone generating apparatus comprising a closely adhered electrode structure of (i) an anode composed of an electrically conductive porous material carrying an ozone generating catalyst, (ii) a perfluorocarbonsulfonic acid ion-exchange membrane which is a solid electrolyte, and (iii) a cathode composed of a gas electrode carrying a catalyst, and means for supplying an oxygen-containing gas to the cathode side, wherein the gas electrode as the cathode has a hydrophilic property and a hydrophobic property and carries a catalyst unevenly distributed therein at the ion-exchange membrane side, and a process for generating ozone using the apparatus. The electrolysis is conducted while supplying an oxygen-containing gas to the cathode side.

5 Claims, No Drawings

APPARATUS FOR ELECTROLYTIC OZONE GENERATION

FIELD OF THE INVENTION

The present invention relates to an apparatus and process for electrolytic ozone generation for safely and efficiently producing ozone at high purity with low electric power.

BACKGROUND OF THE INVENTION

Ozone is widely used in various fields, such as water treatment, foods, medical hygiene, semiconductor production, etc., as a strong oxidizing agent. Ozone is usually produced by a discharging method or an electrolytic method but recently an electrolytic method capable of producing ozone in high concentration has been mainly used.

The electrolytic ozone generating method is the anodic electrolytic reaction according to the formula (1) below with the oxygen generating reaction according to the formula (2) below occurring as a side reaction.

$$3H_2O \rightarrow O_3 + 6H^+ + 6e \qquad (1)$$

$$2H_2O \rightarrow O_2 + 4H^+ + 4e \qquad (2)$$

On the other hand, the cathodic reaction is usually a hydrogen generating reaction according to the formula (3) below but by supplying an oxygen-containing gas, the oxygen reduction reaction of formula (4) can also occur.

$$2H^+ + 2e \rightarrow H_2 \qquad (3)$$

$$O_2 + 4H^+ + 4e \rightarrow 2H_2O \qquad (4)$$

U.S. Pat. No. 4,416,747 discloses a process for generating hydrogen at the cathode side and ozone and oxygen at the anode side by carrying out an electrolysis using an ion-exchange membrane as the electrolyte. Also, U.S. Pat. No. 4,541,989 discloses a process for producing ozone without generation of hydrogen from a cathode using a tetrafluoroborate as the electrolyte, an oxygen reduction cathode as the cathode, and glassy carbon as the anode. Furthermore, JP-B-2-44908 (the term "JP-B" as used herein means an "examined published Japanese patent application") discloses a process for generating ozone by combining an ion-exchange membrane as the electrolyte and an oxygen reduction electrode.

However, in the process described in U.S. Pat. No. 4,416,747 described above, the hydrogen generated at the cathode is originally unnecessary and a means for treating hydrogen rather becomes necessary. In addition, there is a further disadvantage in that some of the hydrogen intermixes with an anodic gas containing oxygen and ozone through the membrane with the system becoming hazardous if the explosion limit is reached. Also, the intermixing of hydrogen is not only dangerous but also in the case that ozone is generated for washing semiconductors, a disadvantage occurs because the concentration of hydrogen in the oxygen is over several hundreds ppm. This is over the upper concentration limit of hydrogen, with the result that the ozone thus generated cannot be used for washing semiconductors.

Furthermore, the theoretical decomposition voltage for generating ozone by the combination of formula (1) and formula (2) described above is 1.5 V, which is higher than the decomposition voltage of 1.2 V using conventional water electrolysis by the combination of formula (2) and formula (3), the cell voltage under a practical electrolytic conditions, for example, 100 A/dm$^2$, is high as about 3.3 V, and hence the amount of electric power consumed becomes very high.

Also, in the process described in U.S. Pat. No. 4,541,989 described above, to obtain ozone with good efficiency, it becomes necessary to maintain the electrolytic cells at a low temperature by cooling the electrolytic cells. However, although the working characteristics of the gas electrode used for oxygen reduction are excellent at high temperature, the working characteristics thereof are quite low at low temperatures. Thus, there is the disadvantage that the process can be operated from a practical standpoint at a low electric current density only.

Furthermore, the process described in JP-B-2-44908 described above can be safely used to produce ozone at a high concentration but there is the disadvantage that the electric current density must also be kept at a low density from the standpoint of the working characteristics and hence ozone cannot be produced with good efficiency.

For generating ozone with good efficiency, it is desirable to conduct the electrolysis at a relatively low temperature of not higher than 60° C. and at a current density of at least 50 A/dm$^2$ but hitherto, a gas electrode which sufficiently functions under these conditions has not yet been found.

SUMMARY OF THE INVENTION

An object of the present invention is to overcome the above-described problems in the conventional techniques and to provide an electrolytic ozone generating apparatus and process capable of operating at a high electric current density and capable of being used to produce ozone efficiently at high purity and at a high concentration with a low electric power without the generation of hydrogen substantially occurring at the cathode.

The electrolytic ozone generating apparatus according to the present invention comprises (a) a closely adhered electrode structure comprising (i) an anode composed of an electrically conductive porous material carrying an ozone generating catalyst, (ii) a perfluorocarbonsulfonic acid ion-exchange membrane as a solid electrolyte, and (iii) a cathode composed of a gas electrode carrying a catalyst, and means for supplying an oxygen-containing gas to the cathode side, wherein the cathode comprises said gas electrode having a hydrophilic property and a hydrophobic property and carrying catalyst unevenly distributed therein at the ion-exchange membrane side. Electrolysis is carried out while supplying an oxygen-containing gas to the cathode side.

The electrolytic ozone generating process according to the present invention comprises electrolyzing water by passing an electric current through an electrolysis apparatus comprising a closely adhered electrode structure of (i) an anode composed of an electrically conductive porous material carrying an ozone generating catalyst, (ii) a perfluorocarbonsulfonic acid ion-exchange membrane which is a solid electrolyte, and (iii) a cathode composed of a gas electrode carrying a catalyst, wherein the gas electrode as the cathode has a hydrophilic property and a hydrophobic property and carries a catalyst unevenly distributed therein at the ion-exchange membrane side; while supplying an oxygen-containing gas to the cathode side of the electrolysis apparatus.

DETAILED DESCRIPTION OF THE INVENTION

The present invention is described in detail below.

When water is electrolyzed in the electrolytic ozone generating apparatus of the present invention having the structure described above while supplying an oxygen-containing gas to the cathode side of the apparatus, the anodic reaction and the cathodic reaction become the reactions shown by the formula (1) and formula (4), respectively, above and ozone can be produced without or substantially without generating hydrogen which possibly can cause an explosion and thus an additional post-treatment thereof is required. Also, the theoretical decomposition voltage thereof is 0.3 V, whereby ozone can be produced at a high electric current density of about 100 A/dm$^2$, which has never been achieved in a conventional gas electrode, and at a low cell voltage of about 2.3 V.

Suitable examples of ozone generating anode catalysts which can be used in the present invention comprise conventional anode catalysts for ozone electrolysis, such as lead dioxide, tin dioxide, platinum, and glassy carbon. Lead dioxide is preferably used since this catalyst exhibits high efficiency at high current density. The anode catalyst is carried on an electrically conductive porous material such as sintered titanium fibers or titanium powders to form an anode. The anode catalyst can be powdered, mixed with the fine particles of polytetrafluoroethylene, and hot-pressed or in particular, in the case of lead dioxide, the anode catalyst can be applied onto the porous material by electrodeposition.

The ion-exchange membrane used as the electrolyte in the present invention is a perfluorocarbonsulfonic acid ion-exchange membrane such as Nafion (trade name, made by E.I. du Pont de Nemours & Co., Inc.) and an ion-exchange membrane having a thickness of about 200 μm is generally used. However, if the ion-exchange membrane has sufficient mechanical strength, an ion-exchange membrane having a thinner thickness can be used to reduce electrical resistance. If the ion-exchange capacity of the ion-exchange membrane is from 0.7 to 1.2 milli-equivalent per gram thereof, the ion-exchange membrane will sufficiently function as the electrolyte and will have sufficient mechanical strength.

A gas electrode having a hydrophilic portion and a hydrophobic portion is used as described above as the cathode. This is because water molecules carried by protons from the anode side through the ion-exchange membrane are quickly removed from the periphery of the catalyst. That is, if the hydrophilic portion and the hydrophobic portion do not exist together, the oxygen-containing gas supplied to the cathode collides with the water molecules going from the cathode side towards the outside, whereby water molecules cannot be smoothly removed. By forming a hydrophilic portion and a hydrophobic portion, the water molecules are easily removed from the hydrophilic portion to the outside of the cathode.

For forming the hydrophilic portion and the hydrophobic portion in the cathode, the cathode may be formed of a hydrophilic material and a hydrophobic material. For example, a carbon powder or a fine metal powder of Ni or Ag can be advantageously used as the hydrophilic material and, for example, a polytetrafluoroethylene powder or a fluorinated graphite can be advantageously used as the hydrophobic material.

When the cathode catalyst is concentrically present in the cathode at the portion in contact with the ion-exchange membrane, electrolysis using the ion-exchange membrane as the electrolyte can be smoothly carried out. Accordingly, in producing the cathode used in the present invention, it is preferred that fine particles of a hydrophobic polymer such as polytetrafluoroethylene are mixed with hydrophilic electrically conductive fine particles such as carbon. After press-adhering the mixture by heating the mixture to an electrically conductive porous material such as sintered product of stainless steel fibers or stainless steel powders, carbon fibers, etc., with a high hydrophilic property, a catalyst such as platinum is applied to the porous material at the side only thereof adjacent the ion-exchange membrane. Examples of methods of applying the catalyst to one surface of the support are a method of press-adhering a previously formed layer of platinum-carrying carbon, etc., to one surface of the porous material, a method of coating a solution containing platinum as a salt thereof on one surface of the porous material and baking the platinum, etc.

The cathode which is a gas electrode having the structure described above is closely adhered to the ion-exchange membrane together with the anode described above followed by press-adhering with heating or an ion-exchange resin solution is coated on one surface of the cathode followed by drying and thereafter the anode is press-adhered thereto by heating to provide an electrode structure, and by incorporating the electrode structure into an electrolytic cell, the electrolytic ozone generating apparatus of the present invention is produced.

When electrolysis is carried out in the electrolytic ozone generating apparatus of the present invention at a temperature of 60° C. or less and an electric current density of at least 50 A/dm$^2$, and preferably at a temperature of from 20° to 40° C. and a current density of from 70 to 130 A/dm$^2$ while supplying water such as ion-exchanged water to the anode side and pure oxygen or an oxygen-containing gas such as high-concentration oxygen obtained by an oxygen concentrating apparatus to the cathode side, an ozone gas of a high concentration and a high purity can be produced with a good efficiency at the anode side without substantially generating any hydrogen at the cathode side.

Examples of producing ozone using the electrolytic ozone generating apparatus of the present invention are described below but the invention is not to be construed as being limited by these examples. Unless otherwise indicated herein, all parts, percents, ratios and the like are by weight.

EXAMPLE 1

By repeating the operation of coating an aqueous hydrochloric acid solution containing chloroplatinic acid on one surface of a sintered titanium fiber material having a thickness of 2 mm (made by Tokyo Seiko K.K.) with a brush and baking at 450° C., a platinum underlayer of 20 g/m$^2$ was applied. After adding a small amount of nitric acid to 800 g/liter of an aqueous lead nitrate solution as an electrolyte, the electrolyte was heated to 70° C., the sintered material described above was immersed in the electrolyte, and after previously carrying out a pre-electrolysis at a current density of 10 A/dm$^2$, electrolysis was carried out at a current density of 4 A/dm$^2$ to electrodeposit a β-lead dioxide layer onto the surface of the sintered material as an anode.

As an ion-exchange membrane, Nafion 117 (trade name, made by E.I. du Pont de Nemours & Co., Ltd.) subjected to a steam treatment was used.

A mixture of a graphite powder (made by Tokai Carbon Co., Ltd.) and an aqueous suspension of Teflon (trade name, made by E.I. du Pont de Nemours & Co., Ltd.) was press-adhered to both surfaces of a carbon woven fabric by heating to 200° C. To one surface thereof was further press-adhered a mixture of an aqueous suspension of platinum-carrying carbon and Teflon and a solution of Nafion by heating to 120° C. to form a cathode.

The effective area of these electrodes and the ion-exchange membrane was 56 cm$^2$.

The anode, the ion-exchange membrane, and the cathode were closely adhered to each other and incorporated in an electrolytic cell of titanium. Ion-exchanged water was supplied to the anode side using a metering pump and oxygen was supplied to the cathode side from the upper portion of the electrolytic cell. When electrolysis was carried out at a current density of 100 A/dm$^2$ while maintaining liquid temperature at 40° C., the cell voltage was 2.30 V, the hydrogen concentration in the cathode side was 0.01%, the ozone concentration was 15.5%, and the hydrogen concentration in the anode gas was less than 20 ppm. The required electric power per gram of ozone was calculated to be 49.7 W·hr.

EXAMPLE 2

When the same electrolytic cell as used in Example 1 was used, oxygen having a concentration of 80% produced using a PSA-type oxygen concentration apparatus was supplied to the cathode side of the electrolytic cell, and ozone was produced under the same electrolytic conditions as in Example 1, the cell voltage was 2.40 V, the hydrogen concentration in the cathode gas was 0.06%, the ozone concentration was 16%, and the hydrogen concentration in the anode gas was 200 ppm. The required electric power per gram of ozone was calculated to be 50.2 W·hr.

COMPARATIVE EXAMPLE 1

When the same electrolytic cell as described in Example 1 was used and the hydrogen generation and the ozone generation were carried out without supplying oxygen to the cathode side of the electrolytic cell, the cell voltage was 3.30 V, the ozone concentration was 15.4%, and the hydrogen concentration in the anode gas was 0.3%. The required electric power per gram of ozone was calculated to be 71.8 W·hr.

From the results obtained in the examples and the comparative example above, it can be seen that even when the electrolytic ozone generating apparatus of the present invention is operated at a high electric current density of 100 A/dm$^2$, an ozone gas having a relatively high concentration of from 15 to 16% can be obtained at a considerably lower electrolytic voltage of from 2.3 to 2.4 V than that of from 2.90 to 3.30 V in the comparative example, that is, at a low amount of electric power consumed.

As described above, by using the electrolytic ozone generating apparatus of the present invention, the electrolytic voltage can be kept low, whereby the production of ozone can be carried out while restraining the amount of electric power consumed to about 30%.

Furthermore, a relatively high electric current density of at least, for example, 50 A/dm$^2$, can be maintained at a relatively low temperature of not higher than, e.g., 60° C., which is suitable for the production of ozone, and ozone can be produced with good efficiency.

Also, by using the cathode described above, the generation of hydrogen at the cathode can be substantially prevented, whereby the danger of explosion due to mixing of hydrogen and oxygen can be avoided enabling the safe operation of the ozone production and the treatment of hydrogen becomes unnecessary. Furthermore, by using this cathode, the hydrogen concentration intermixing in the ozone gas produced can be greatly reduced and high-purity ozone can be produced.

While the invention has been described in detail and with reference to specific examples thereof, it will be apparent to one skilled in the art that various changes and modifications can be made therein without departing from the spirit and scope thereof.

What is claimed is:

1. An electrolytic ozone generating apparatus comprising a closely adhered electrode structure of
   (i) an anode composed of an electrically conductive porous material carrying an ozone generating catalyst,
   (ii) a perfluorocarbonsulfonic acid ion-exchange membrane which is a solid electrolyte, and
   (iii) a cathode composed of a gas electrode carrying a catalyst, and
   means for supplying an oxygen-containing gas to the cathode side,
wherein the gas electrode as the cathode has a hydrophilic property and a hydrophobic property and carries a catalyst unevenly distributed therein at the ion-exchange membrane side.

2. The electrolytic ozone generating apparatus according to claim 1, wherein the ozone generating catalyst carried on the electrically conductive porous material as the anode is lead dioxide, tin dioxide, platinum or glassy carbon.

3. The electrolytic ozone generating apparatus according to claim 1, wherein the electrically conductive porous material is sintered titanium fibers.

4. The electrolytic ozone generating apparatus according to claim 1, wherein the ion-exchange membrane has an ion-exchange capacity of 0.7 to 1.2 milliequivalents per gram.

5. The electrolytic ozone generating apparatus according to claim 1, wherein the hydrophobic property of the gas electrode is provided by polytetrafluoroethylene and the hydrophilic property of the gas electrode is provided by carbon.

* * * * *